(12) United States Patent
Johnston

(10) Patent No.: US 7,619,644 B2
(45) Date of Patent: Nov. 17, 2009

(54) METHOD AND APPARATUS FOR IMAGE ALIGNMENT

(75) Inventor: Peter Johnston, San Mateo, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 0 days.

(21) Appl. No.: 11/479,562

(22) Filed: Jun. 30, 2006

(65) Prior Publication Data

US 2008/0002018 A1    Jan. 3, 2008

(51) Int. Cl.
B41J 2/435    (2006.01)
B41J 2/47    (2006.01)

(52) U.S. Cl. ...................... 347/237; 347/247

(58) Field of Classification Search ............ 347/131, 347/234–240, 246–252, 255, 135, 144; 332/109; 358/443; 250/234
See application file for complete search history.

(56) References Cited

U.S. PATENT DOCUMENTS

| | | | | |
|---|---|---|---|---|
| 4,782,398 A | * | 11/1988 | Mita | 358/443 |
| 5,477,257 A | | 12/1995 | Murata | |
| 5,646,670 A | * | 7/1997 | Seto et al. | 347/131 |
| 5,739,842 A | * | 4/1998 | Murata | 347/252 |
| 5,760,811 A | * | 6/1998 | Seto et al. | 347/131 |
| 6,215,513 B1 | * | 4/2001 | Ashikaga | 347/252 |
| 6,252,675 B1 | | 6/2001 | Jacobs | |
| 6,472,946 B2 | * | 10/2002 | Takagi | 332/109 |
| 6,476,847 B2 | * | 11/2002 | Satoh et al. | 347/252 |
| 6,498,617 B1 | * | 12/2002 | Ishida et al. | 347/252 |
| 6,603,116 B2 | * | 8/2003 | Niito | 250/234 |
| 6,731,317 B2 | * | 5/2004 | Ema et al. | 347/135 |
| 6,775,032 B2 | | 8/2004 | Jacobs | |
| 7,031,025 B1 | | 4/2006 | He et al. | |
| 7,064,859 B1 | | 6/2006 | Dittrich et al. | |
| 7,428,075 B2 | | 9/2008 | Johnston | |
| 2001/0030769 A1 | | 10/2001 | Jacobs | |
| 2001/0030796 A1 | | 10/2001 | Yao | |
| 2004/0156079 A1 | | 8/2004 | Marshall et al. | |
| 2008/0002228 A1 | | 1/2008 | Johnston | |
| 2008/0007744 A1 | | 1/2008 | Johnston | |
| 2008/0007745 A1 | | 1/2008 | Johnston | |

* cited by examiner

*Primary Examiner*—Hai C Pham
(74) *Attorney, Agent, or Firm*—Finnegan, Henderson, Farabow, Garrett & Dunner, L.L.P.

(57) ABSTRACT

Apparatus, systems, and methods presented herein allow for the alignment of images. In some embodiments, a plurality of PWM modules each receive input data and corresponding input phase-shifted clock signals. In some embodiments, each PWM module generates an output phase-shifted PWM signal based on the input data and its corresponding input phase-shifted clock signal. In some embodiments, a selector selects one of the output phase-shifted PWM signal based on timing relationships between an event signal and the phase-shifted clock signals.

11 Claims, 7 Drawing Sheets

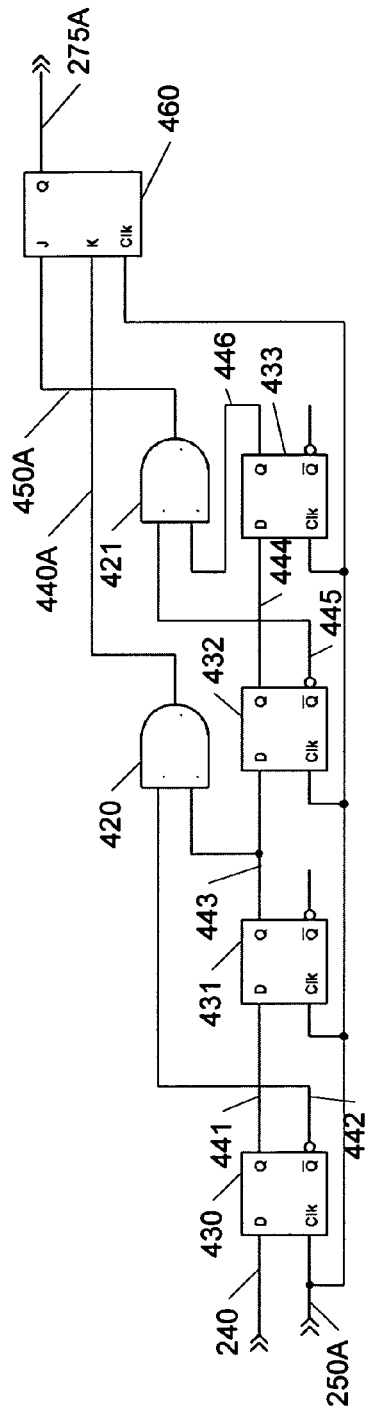
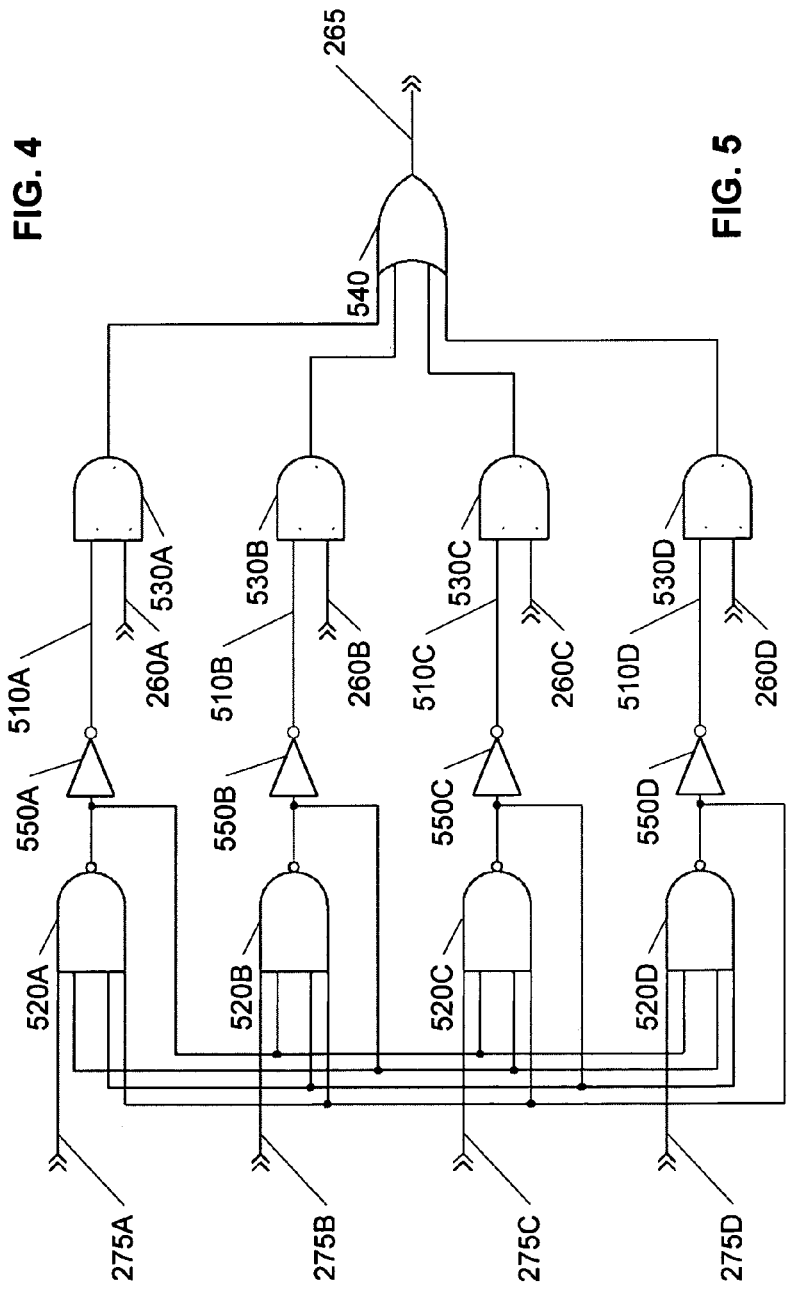
FIG. 4
FIG. 5

METHOD AND APPARATUS FOR IMAGE ALIGNMENT

CROSS-REFERENCE TO RELATED APPLICATIONS

This application is related to U.S. patent applications entitled "Systems for Generating a Pulse Width Modulated Signal" (Ser. No. 11/479,294), "Circuitry to Support Justification of PWM Pixels" (Ser. No. 11/480,221), "Systems and Methods for Processing Pixel Data for a Printer" (Ser. No. 11/479,596) and "Systems and Methods for Processing Pixel Data for a Printer" (Ser. No. 11/479,896), filed concurrently herewith and incorporated in their entirety for all purposes.

FIELD OF THE INVENTION

This invention generally relates to electronic printer technology. The invention more particularly relates to a system and apparatus for image alignment.

BACKGROUND OF THE INVENTION

In some systems, a scanning region of a print surface is scanned with a scanning beam cyclically deflected with a rotating light deflector. The scanned region of the print surface is later transferred to the printed page. The scanning beam is detected by a light sensor which generates a synchronizing "beam detect" signal. Some laser printers use the "beam detect" signal to signal the start of each successive line of data being sent from the scanning laser beam to the printed page. Techniques exist for synchronizing printing to the beam detect signal within a single pixel clock cycle. A drawback of these techniques is that a misalignment of up to one pixel may result.

Another technique involves the passing of a main clock signal through a serially chained series of gates. Each gate delays the clock by a small amount. The resultant skewed clocks are sent as output from the system after each gate delay. The skewed clock most closely aligned with the "beam detect" signal is selected. The skewed clock approach does not work well because of the extensive gating logic required to generate the clocks. For example, because of the extent of logical gating needed, the clock cannot run quickly enough for satisfactory alignment resolution of a printer.

Thus, there is a need for apparatus, methods, and systems for image alignment that use less gating logic and allow the clock to effectively run at higher frequencies.

SUMMARY OF THE INVENTION

Presented is a system and method comprising a plurality of PWM modules that may each receive input data and corresponding input phase-shifted clock signals. Each PWM module may generate an output phase-shifted PWM signal based on the input data and its corresponding input phase-shifted clock signal. A selector may select one of the output phase-shifted PWM signal based on timing relationships between a first event signal and the input phase-shifted clock signals.

In some embodiments, the start timing of the selected output phase-shifted PWM signal may be determined based on its corresponding input phase-shifted clock signal and the end timing of the selected-output phase-shifted PWM signal may be determined based on the input data. The selector may comprise a plurality of circuits, each circuit corresponding to one of the PWM modules and receiving the corresponding input phase-shifted clock signal. Each circuit may generate a second signal based on its corresponding input phase-shifted clock signal and the first event signal.

In some embodiments, the timing relationship used to select one of the output phase-shifted PWM signals may be based further on the time duration between the first event signal and one of the second event signals. The selected output phase-shifted PWM signal may correspond to the input phase-shifted clock signal that minimizes time duration between the beginning of its immediately subsequent clock cycle and the first event signal.

In some embodiments, each of the PWM modules may comprise a first circuit that receives the input phase-shifted clock signal corresponding to the PWM module and a second circuit that may produce a count based on the corresponding input phase-shifted clock signal, wherein the count may be reset based on the second event signal. The first circuit may generate a second event signal based on its corresponding input phase-shifted clock signal and the event signal.

In some embodiments, each PWM module may generate its output phase-shifted PWM signal based on the count and the input data. Each PWM module may receive the input data in synchronization with its corresponding input phase-shifted clock signal. The event signal may correspond to a horizontal synchronization event.

Additional objects and advantages of the invention will be set forth in part in the description, which follows and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one or more embodiments of the invention and together with the description, serve to explain the principles of the invention.

BRIEF DESCRIPTION OF THE DRAWINGS

FIG. 4 shows a logic diagram for exemplary gating logic that may be used to implement portions of control logic.

FIG. 5 shows a logic diagram that may be used to implement a selector.

DETAILED DESCRIPTION

Reference will now be made in detail to one or more exemplary embodiments of the present invention as illustrated in the accompanying drawings. Wherever possible, the same reference numbers will be used throughout the drawings to refer to the same or like parts.

Figure 1:
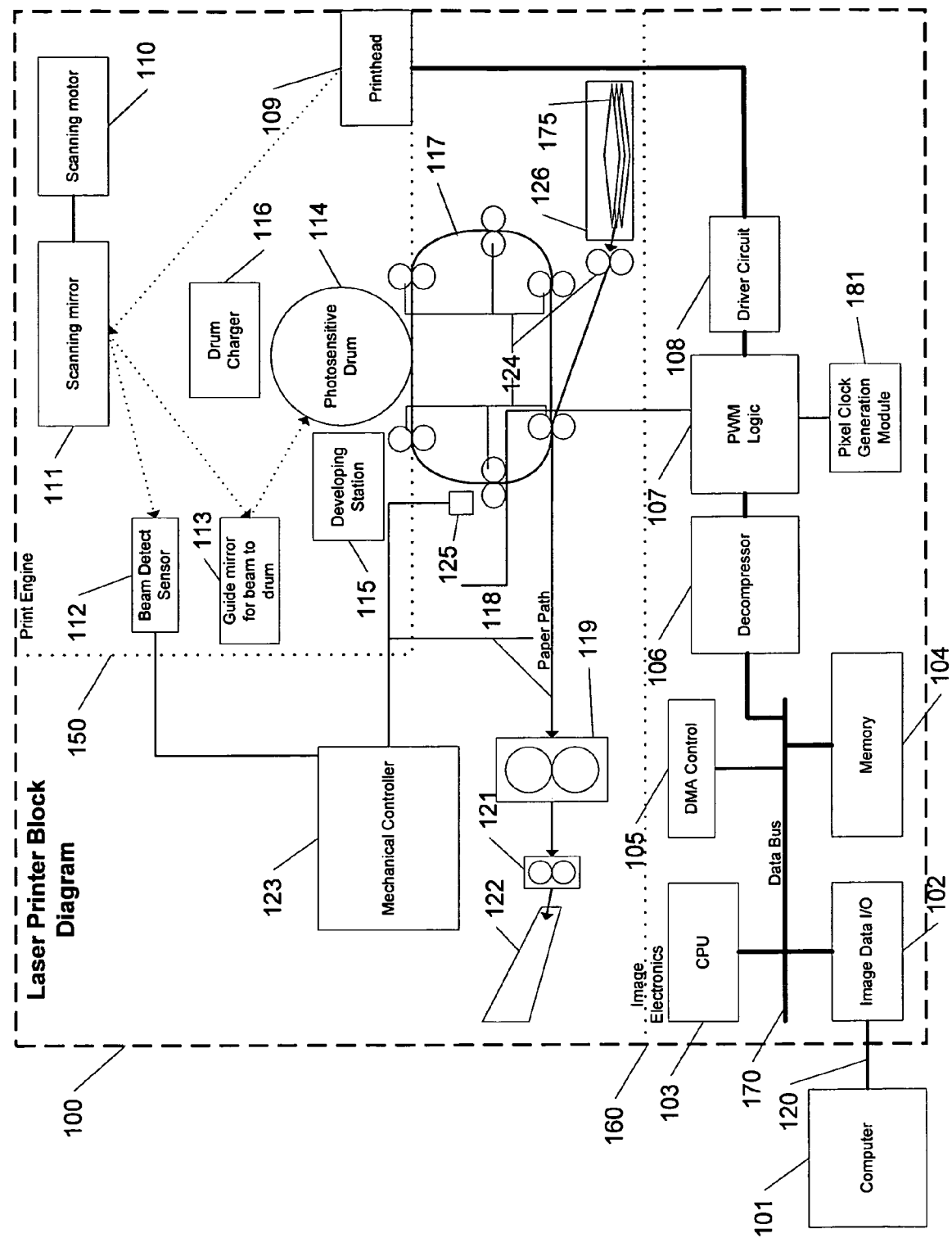
FIG. 1 shows a block diagram of an exemplary laser printer connected to an exemplary computer.

FIG. 1 shows a block diagram of an exemplary printer 100, which is coupled to exemplary computer 101 using connection 120. Computer 101 may send image data to image electronics subsystem 160 over connection 120. Data received by printer 100 may be routed internally along internal data paths, such as exemplary data bus 170, and other data and control signal paths (not shown) to various internal functional modules of printer 100 as determined by control logic in printer 100. As shown in FIG. 1, image data input/output ("IO") module 102, central processing unit (CPU) 103, direct memory access (DMA) control module 105, memory 104, and decompressor module 106, may be coupled using data bus 170.

In some embodiments, data received by image data I/O module 102 may be placed in memory 104 using DMA control module 105 under the control of the CPU 103. Decompressor module 106 may also be coupled to pulse width modulation (PWM) logic module 107. Decompressor module 106 may receive compressed pixel data, decompress the received pixel data, and send it to PWM logic module 107. Various data and control signal paths may also couple PWM logic module 107, pixel clock generation module 181, driver circuit 108, printhead 109, mechanical controller 123, beam detect sensor 112 and transfer belt position sensor 125. Beam detect sensor 112 and/or belt position sensor 125 may each generate one or more signals related to scan lines in images.

Driver circuit 108 may be communicatively coupled to PWM logic module 107 and printhead 109. In some embodiments, printhead 109 may be a laser printhead. Scanning mirror 111 may be mechanically or electromagnetically coupled to scanning motor 110, which may be used to rotate scanning mirror 111. Light from printhead 109 may be transmitted to scanning mirror 111 and scanning mirror 111 may reflect that light, at different times, to beam detect sensor 112 and beam-to-drum guide mirror 113. Beam-to-drum guide mirror 113 may reflect light from scanning mirror 111 to photosensitive drum 114. Drum charger 116 may be used to charge photosensitive drum 114.

Paper 175 may be passed from paper input tray 126 through transfer rollers 124 to transfer belt 117 where latent images from photosensitive drum 114 may be transferred to paper 175. In some embodiments, latent images from photosensitive drum 114 may be developed with toner at developing station 115 before transfer to paper 175. The transfer of images from photosensitive drum 114 to paper 175 may occur while paper 175 is on transfer belt 117 or by other methods. After the image has been transferred, paper 175 may be moved over paper path 118 using transfer rollers 124 and past fuser 119, guide rollers 121, and to paper output tray 122. Fuser 119 may facilitate the bonding of the transferred image to paper 175.

Printer 100 may be a laser printer, an LED printer, or any other printer consistent with principles of the present invention. Computer 101 may be a computer workstation, desktop computer, laptop computer, or any other computing device capable of being used with printer 100. Connection 120 may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, FIREWIRE and/or serial or parallel ports for transmission of data through appropriate connection 120. The communication links could be wireless links or wired links or any combination consistent with embodiments of the present invention that allows communication between computing device 101, and printer 100.

Data transmitted to printer 100 by computer 101 may also include destination addresses and/or commands to facilitate routing. In some embodiments, data bus 170 may include a subsystem that transfers data or power among modules. Data bus 170 may logically connect several modules over the same set of wires or over separate wires for each connection. Data bus 170 may be any physical arrangement that provides the same logical functionality as a parallel bus and may include both parallel and bit-serial connections. Further, data bus 170 may be wired in either an electrical parallel or daisy chain topology, or connected by switched hubs.

Exemplary print engine 150 of printer 100 may include beam detect sensor 112, beam-to-drum guide mirror 113, developing station 115, photosensitive drum 114, drum charger 116, scanning mirror 111, scanning motor 110, and printhead 109. Beam detect sensor 112 and/or belt position sensor 125 may each generate one or more signals for each scan line in an image, or for a set of scan lines in an image, or for each image and send the generated signals to mechanical controller 123, which then sends signals to PWM logic module 107. As shown in FIG. 1, exemplary image electronics subsystem 160 may include CPU 103, image data I/O module 102, memory 104, DMA control module 105, data bus 170, decompressor module 106, PWM logic module 107, and driver circuit 108. The various modules and subsystems described above may be implemented by hardware, software, or firmware or by various combinations thereof.

The image data sent from computer 101 to printer 100 may be compressed. In some embodiments, the compressed image data may be in a line-sequential compressed format. Various other formats such as Postscript, PCL, and/or other public or proprietary page description languages may also be used to transfer image data. Image data received by image data I/O module 102 may be placed in memory 104. In some embodiments, when image data for a complete page has been stored in memory 104, a print sequence may be initiated. In some embodiments, mechanical controller 123 may initiate operations of scanning motor 110, photosensitive drum 114, and transfer belt 117 through appropriate data and/or control signals.

Beam detect sensor 112 can detect a laser beam's position and generate pulses that are sent to image electronics subsystem 160 so that image data can be properly aligned from line to line in a printed image. In some embodiments, at the beginning of a scan of each line of the image, light from the printhead 109 may be reflected by scanning mirror 111 onto beam detect sensor 112. Beam detect sensor 112 may signal mechanical controller 123 which, in turn, may send a beam detect signal 240 to PWM logic module 107. In some embodiments, a separate signal typically referred to as top of data (TOD) or "vsync" may also be generated by mechanical controller 123, based on information received from transfer belt position sensor 125. The TOD or vsync signal indicates when image data transfer can begin for paper 175. For example, when paper 175 passes transfer belt position sensor 125, a TOD signal may be sent to PWM logic module 107 via mechanical controller 123. Once the TOD signal is received, CPU 103 may initiate a transfer from memory 104 to decompressor module 106. Decompressor module 106 may decompress image data and pass the resulting raw image data to PWM logic module 107. The resultant PWM pulses from PWM logic module 107 may then be streamed to driver circuit 108, which may then transmit the PWM pulses to printhead 109.

In some embodiments, laser light from printhead 109 may be pulsed and reflected off scanning mirror 111 and beam-to-drum guide mirror 113, causing a latent image of charged and discharged areas to be built up on photosensitive drum 114. A toner may develop this latent image at developing station 115 and the latent image transferred to transfer belt 117. For a multi-component image, such as a color image, the latent image building process may repeat for each of the components. For example, for CMYK color printers, which use cyan ("C"), magenta ("M"), yellow ("Y"), and black ("K"), the latent image building process on photosensitive drum 114 may be repeated for each of the colors C, M, Y, and K. When all components have been assembled on transfer belt 117, paper 175 may be fed from paper input tray 126 to transfer roller 124 where the image may be transferred to paper 175. Fuser 119 may then fix the toner to paper 175, which can be sent to paper output tray 122 using guide rollers 121.

Pixel clock generation module 181 may be a crystal oscillator or a programmable clock oscillator, or any other appropriate clock generating device. In some embodiments, such as in a "multi-pass" printer 100, which sends the video data for each color serially in sequence, the frequency of the clock generated by the pixel clock generation module 181 may be fixed among each pass of the printer. For example for a multi-pass printer 100, the pixel clock generation module 181 may be a crystal oscillator. In another embodiment, such as a printer 100 that uses multiple sets of print engines 150, sometimes collectively referred to as a "tandem engine", the frequency of each channel may be calibrated if the frequencies differ among the pixel clocks corresponding to each of the color components. In such embodiments, one or more programmable clock oscillators may be used to allow for calibration.

Exemplary embodiments of printer 100 may include driver circuit 108 driving multiple sets of print engines 150, which may be connected to multiple printheads 109. In some embodiments, printheads 109 could all be laser printheads. There may also be a plurality of individual modules of image electronics subsystem 160. For example, a single decompressor module 106 may be connected to multiple PWM logic modules 107 with each PWM module 107 being connected to one or more pixel clock generation modules 181 and one or more driver circuits 108. Decompressor module 106 could provide each PWM logic module 107 with one or more color components of an image, which would then be sent to the multiple driver circuits 108 for onward transmission to one or more sets of print engine 150.

In other embodiments, multiple decompressor modules 106 may be coupled to multiple PWM logic modules 107. Each decompressor module 106 may provide a PWM logic module 107 with a decompressed component of the image. In other embodiments a single PWM logic module 107 could provide multiple components of the image to multiple driver circuits 108.

In some embodiments, printer 100 may have multiple lasers per laser printhead. Printhead 109 may receive multiple lines of data from driver circuit 108 and project the multiple lines of data to scanning mirror 111. Scanning mirror 111 may then reflect the multiple lines of data to beam detect sensor 112 and guide mirror 113, which may reflect the multiple lines to photosensitive drum 114. In some embodiments, the beam detect sensor 112 may detect a signal, such as a laser signal, reflected off of the scanning mirror 111, or may also detect multiple signals reflected off scanning mirror 111.

The coupling discussed herein may include, but is not limited to, electronic connections, coaxial cables, copper wire, and fiber optics, including the wires that comprise data bus 170. The coupling may also take the form of acoustic or light waves, such as lasers and those generated during radio-wave and infra-red data communications. Coupling may also be accomplished by communicating control information or data through one or more networks to other data devices. Mechanical or electro-mechanical coupling as used herein may include, but is not limited to, the use of physical components such as motors, gear coupling, use of universal joints, or any other mechanical or electro-mechanical device usable to couple items together.

Each of the logical or functional modules described above may comprise multiple modules. The modules may be implemented individually or their functions may be combined with the functions of other modules. Further, each of the modules may be implemented on individual components, or the modules may be implemented as a combination of components. For example, CPU 103, decompressor module 106, PWM logic module 107, may each be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of modules 103, 106 or 107. Memory 104 may comprise a random access memory (RAM), a read only memory (ROM), a programmable read-only memory (PROM), a field programmable read-only memory (FPROM), or other dynamic storage device, coupled to data bus 170 for storing information and instructions to be executed by image electronics subsystem 160.

Figure 2:
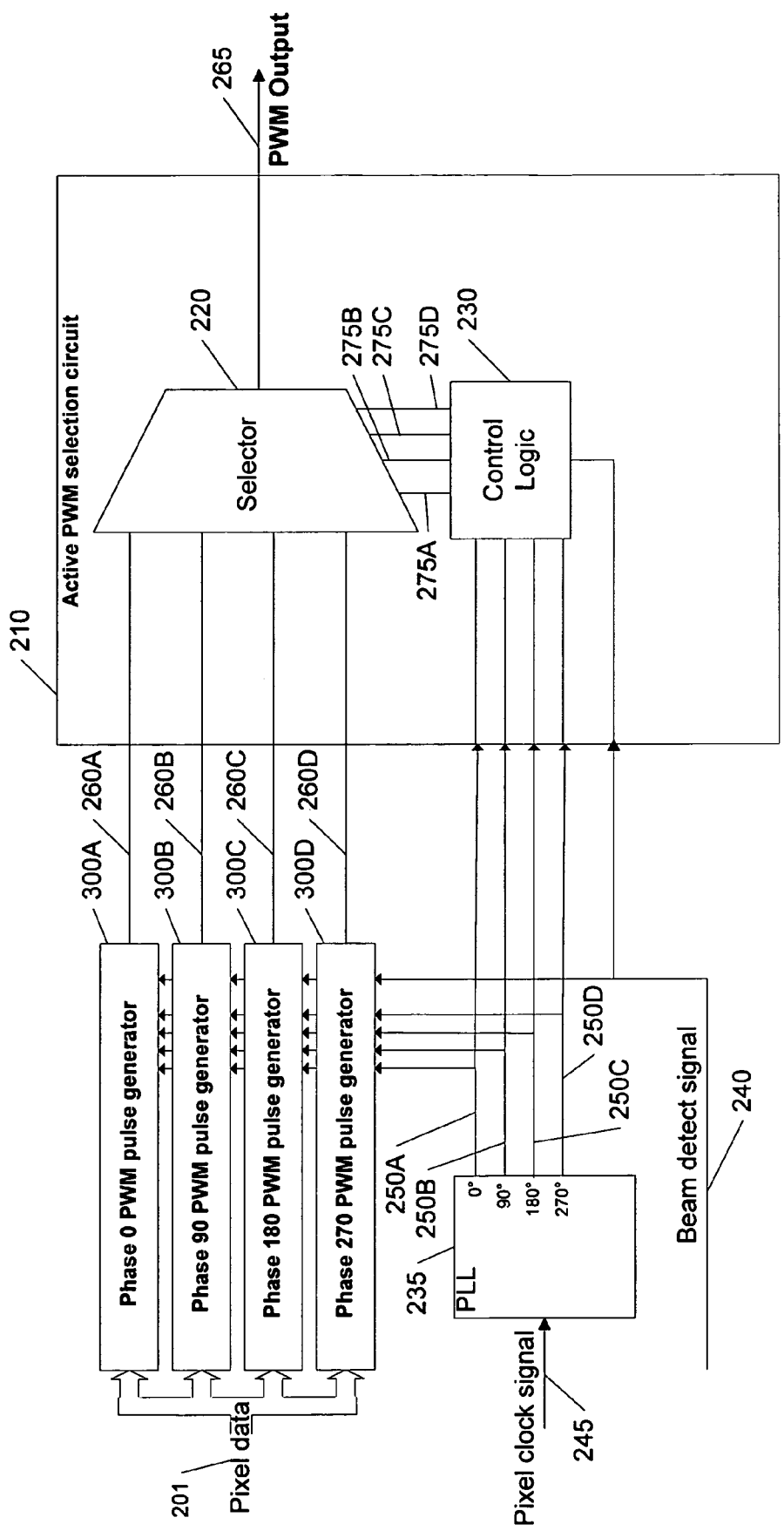
FIG. 2 shows a block diagram of exemplary PWM logic module.

FIG. 2 shows a block diagram of exemplary PWM logic module 107. In some embodiments, pixel data 201 may be received at each PWM pulse generator: phase 0 PWM pulse generator 300A, phase 90 PWM pulse generator 300B, phase 180 PWM pulse generator 300C, and phase 270 PWM pulse generator 300D. Pixel data 201 may be received from decompressor module 106 and may comprise multiple bits of data for each clock cycle. For example, if sixteen bits of pixel data 201 are to be transmitted on each pixel clock cycle, then pixel data 201 may be communicated via a wider data path to PWM pulse generators 300A, 300B, 300C, and 300D.

As shown in FIG. 2, PWM pulse generators 300A, 300B, 300C, and 300D may be coupled to selector 220. Selector 220 may be coupled to control logic 230. The coupling may allow multiple aligned beam detect signals 275A, 275B, 275C, and 275D to be transmitted between selector 220 and control logic 230. Aligned beam detect signals 275A, 275B, 275C, and 275D may correspond to beam detect signal 240 aligned with the corresponding input phase-shifted clock signals 250A, 250B, 250C, and 250D.

Pixel clock signal 245 may be received by phased lock loop (PLL) module 235 from any appropriate source, including pixel clock generation module 181 according to some embodiments of the present invention. Phase-shifted clock signals 250A, 250B, 250C, and 250D may run at multiples of the frequency of pixel clock signal 245. For example, input phase-shifted clock signals 250A, 250B, 250C, and 250D may run at four times the frequency of pixel clock signal 245.

PLL module 235 may generate multiple signals in fixed phase relationships to pixel clock 245. As shown in FIG. 2, signals generated by PLL module 235 may include phase 0 clock signal 250A, phase 90 clock signal 250B, phase 180 clock signal 250C, and phase 270 clock signal 250D. PLL module 235 may be coupled to PWM pulse generators 300A, 300B, 300C, and 300D such that all phase-shifted clock signals 250A, 250B, 250C, and 250D may be received at each of PWM pulse generators 300A, 300B, 300C, and 300D. PWM pulse generators 300A, 300B, 300C, and 300D may each be configured to receive beam detect signal 240. In some embodiments, beam detect signal 240 may indicate the detection of the start of a scan line by beam detect sensor 112. In other embodiments, beam detect signal 240 indicate other events related to the alignment of images.

Control logic 230 may be configured to receive beam detect signal 240. PLL module 235 may be coupled to control logic 230 such that control logic 230 may receive each of input phase-shifted clock signals 250A, 250B, 250C, and 250D. In some embodiments, selector 220 may be coupled to driver circuit 108 and may send a PWM output signal 265 to driver circuit 108. Selector 220 could be a multiplexer or any other device capable of selecting one of the output phase-shifted PWM signal 260A, 260B, 260C, and 260D.

Each logical module described above may comprise multiple modules or may be combined with other modules described herein according to some embodiments of the present invention. Further, each logical module may be implemented on individual components or may be implemented as a combination of components. For example, selector 220 and control logic 230 may both be implemented as part of an active PWM selection circuit 210. PWM pulse generators 300A, 300B, 300C, and 300D; selector 220; control logic 230; and/or PLL module 235 may each be implemented by a FPGA, an ASIC, a CPLD, a PCB, a combination of programmable logic components and programmable interconnects combinations of devices or modules capable of performing appropriate functions.

Input beam detect signal 240, which may be asynchronous with pixel clock signal 245 and input phase-shifted clock signals 250A, 250B, 250C, and 250D, may be received by PWM pulse generators 300A, 300B, 300C, and 300D. Each PWM pulse generator 300A, 300B, 300C, and 300D may also receive multiple phase-shifted clock signals 250A, 250B, 250C, and 250D and pixel data 201. PWM pulse generator 300A, 300B, 300C, and 300D may be capable of determining which of the input phase-shifted clock signals is most closely aligned with beam detect signal 240.

PWM pulse generators 300A, 300B, 300C, and 300D may generate an output phase-shifted PWM signal 260A, 260B, 260C, and 260D corresponding to input phase-shifted clock signals 250A, 250B, 250C, and 250D, respectively. Output phase-shifted PWM signals 260A, 260B, 260C, and 260D may be versions of pixel data 201 aligned with a phase-shifted clock signal 250A, 250B, 250C, or 250D, respectively, according to some embodiments of the present invention. In some embodiments, output phase-shifted PWM signals 260A, 260B, 260C, and 260D may be single-bit versions of pixel data 201 with a finer resolution. For example, if pixel data 201 comprises 16 bit data, then output phase-shifted PWM signals 260A, 260B, 260C, and 260D may be a single-bit version of input pixel data 201 with a resolution of ⁄1;16th of a pixel clock cycle. PWM pulse generators 300A, 300B, 300C, and 300D may each send output phase-shifted PWM signals 260A, 260B, 260C, and 260D, respectively, to selector 220.

Control logic 230 may receive phase-shifted clock signals 250A, 250B, 250C, and 250D and beam detect signal 240. Control logic 230 may send aligned beam detect signals 275A, 275B, 275C, and 275D to selector 220. In some embodiments, beam detect signal 240 may be designed such that a transition occurs when a new scan line is detected. A beam detect transition may be defined as either moving from a high state to a low state or from a low state to a high state. For example, in some embodiments, a beam detect transition may refer to a transition of beam detect signal 240 from a high state to a low state.

Aligned beam detect signals 275A, 275B, 275C, and 275D may be generated, for example, based on phase-shifted clock signals 250A, 250B, 250C, and 250D and beam detect signal 240 by aligning beam detect signal 240 along a clock boundary of corresponding input phase-shifted clock signal 250A, 250B, 250C, and 250D, respectively. All aligned beam detect signals 275A, 275B, 275C, and 275D transition (e.g. from a low signal to a high signal or vice versa) in alignment with the corresponding input phase-shifted clock signals 250A, 250B, 250C, and 250D.

In some embodiments, selector 220 may take as input aligned beam detect signals 275A, 275B, 275C, and 275D and output phase-shifted PWM signal 260A, 260B, 260C, and 260D. Selector 220 may determine which aligned beam detect signal 275A, 275B, 275C, and 275D is first to transition (e.g. from high to low or low to high). Selector 220 may select one of output phase-shifted PWM signal 260A, 260B, 260C, and 260D based on which of aligned beam detect signals 275A, 275B, 275C, and 275D was first to transition. PWM output signal 265 may be generated based on selected output phase-shifted PWM signal 260A, 260B, 260C, or 260D.

Figures 3A, 3B:
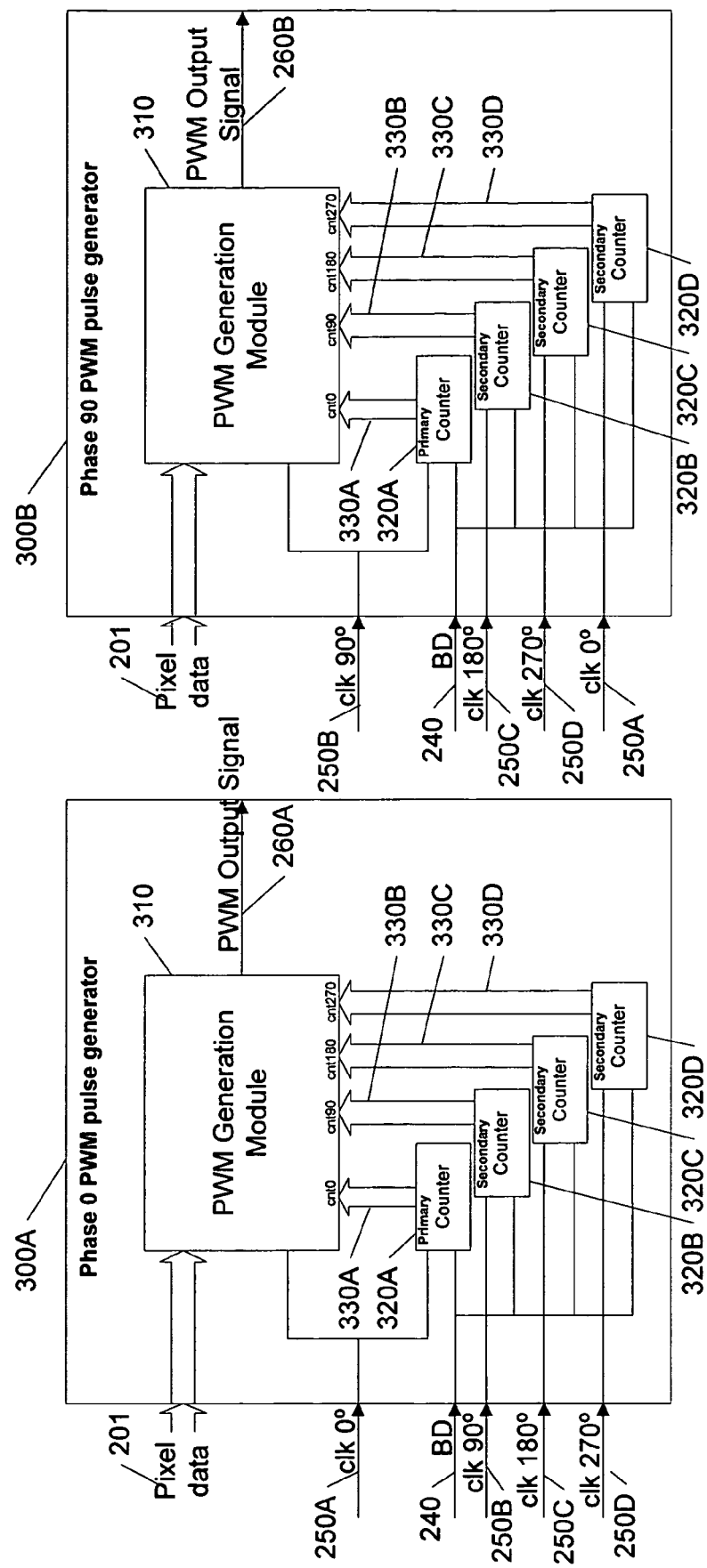
FIG. 3A shows a block diagram of an exemplary phase 0 PWM pulse generator.
FIG. 3B shows a block diagram of an exemplary phase 90 PWM pulse generator.

FIG. 3A shows a block diagram of an exemplary phase 0 PWM pulse generator 300A. Phase 0 PWM pulse generator 300A may comprise PWM generation module 310 that may be coupled to selector 220, primary counter 320A, secondary counters 320B, 320C, 320D, and PLL module 235. PWM generation module 310 may allow multiple bits of count data 330A, 330B, 330C, and 330D to be transmitted between PWM generation module 310 and counters 320A, 320B, 320C, and 320D. For example, two bits of count data may be transmitted between PWM generation counters 320A, 320B, 320C, and 320D and module 310. PWM generation module 310 may receive pixel data 201 from decompressor module 106. In some embodiments, PWM generation module 310 may receive multiple bits of pixel data 201 from decompressor module 106 over multiple data paths or a single data path that is wide enough to transmit multiple bits.

Primary counter 320A may receive beam detect signal 240 and input phase-shifted clock signal 250A. Primary counter 320A may then generate count data 330A based on input phase-shifted clock signal 250A. In some embodiments, primary counter 320A may be reset to zero when beam detect signal 240 transitions. In some embodiments, secondary counters 320B, 320C, and 320D operate in a fashion similar to primary counter 320A. For example, secondary counters 320B, 320C, and 320D may also be reset upon transition of beam detect signal 240 and may increment with input phase-shifted clock signals 250B, 250C, and 250D, respectively.

PWM generation module 310 may receive pixel data 201 and may generate output phase-shifted PWM signal 260A. In some embodiments, PWM generation module 310 may take zero degree phase-shifted clock signal 250A as input. Accordingly, PWM pulse generator 300A, which may correspond to a phase shift of zero degrees, may receive zero degree output phase-shifted PWM signal 260A.

FIG. 3B shows a block diagram of an exemplary phase 90 PWM pulse generator 300B. In some embodiments, logical modules depicted in FIG. 3B may be similar to those depicted in 3A. FIG. 3B may correspond to a phase shift of ninety degrees. Similar block diagrams (not shown) with similar functionality may also be used for phase shifts of one hundred eighty and two hundred seventy degrees.

As depicted in FIG. 3B, PWM pulse generator 300B may include a PWM generation module 310. Accordingly, PWM generation module 310 may receive ninety degree output phase-shifted PWM signal 260B. Note that the phases of clock signals 250A, 250B, 250C, and 250D used as inputs to a PWM generation module 310 and counters 320A, 320B, 320C, and 320D may differ between phase 0 PWM pulse generator 300A and phase 90 PWM pulse generator 300B. Based on the inputs, PWM generation module 310 may output phase-shifted PWM output signal 260B, which may be a single-bit version of pixel data 201 aligned with corresponding input phase-shifted clock signal 250B. In some embodiments, operation of PWM pulse generators 300B, 300C, and 300D may be similar to that of phase 0 PWM pulse generator 300A.

FIG. 4 shows a logic diagram for exemplary gating logic that may be used to implement portions of control logic 230. In some embodiments, there may be similar control logic for input phase-shifted clock signals 250B, 250C, and 250D. The logic modules used in these embodiments may include delay modules 430, 431, 432, and 433; AND gates 420 and 421; and J-K flip flop module 460. Each logic module may be implemented separately or together using a FPGA, an ASIC, a CPLD, a PCB, a combination of programmable logic components and programmable interconnects, single CPU chip, a CPU chip combined on a motherboard, a general purpose computer, or any other combination of devices or modules capable of performing the tasks of the logic module(s). In some embodiments, each of delay modules 430, 431, 432, and 433 and J-K flip flop module 460 may use phase-shifted clock signal 250A.

As shown in FIG. 4, delay module 430 takes phase-shifted clock signal 250A and beam detect signal 240 as input. Delay module 430 may delay the beam detect signal 240 for one cycle of phase-shifted clock signal 250A. Delay module 430 may send the delayed inverse of beam detect signal 442 to AND gate 420 and delayed beam detect signal 441 to delay module 431. As shown in FIG. 4, beam detect signal 240 cascades through the flip-flop 430, 431, 432, and 433 at each cycle of clock 250A. On the next cycle of phase-shifted clock signal 250A, delay module 431 may send beam detect signal 443 to AND gate 420 and delay module 432. AND gate 420 may produce a high signal 440A when output signals 442 and 443 are both high, corresponding to beam detect signal 240 being low at time t_0 and high at time t_1, and thereby detect a low-transitioning beam detect signal 240. The terminology t_X refers to the current time minus the duration of X clock cycles.

As shown in FIG. 4, delay module 432 may cascade delayed input beam detect signal 443 as output signal 444 to delay module 433 and the inverse as output delayed beam detect signal 445 to AND gate 421. Delay module 433 may output delayed beam detect signal 446 to AND gate 421. AND gate 421 receives signal 445 from delay module 432 and signal 446 from delay module 433. AND gate 421 may produce a high signal 450A when signals 445 and 446 are high, which may correspond to beam detect signal 240 being low at time t_2 and high at time t_3.

As shown in FIG. 4, J-K flip-flop module 460 may take signals 440A and 450A as input. J-K flip-flop module 460 may deassert aligned beam detect signal 275A when input signal 440A is high and assert aligned beam detect signal 275A when input signal 450A is high according to some embodiments of the present invention. Aligned beam detect signal 275A may be low at time t_0 when beam detect signal 240 transitioned from high to low between time t_1 and time t_2. Therefore, as depicted in exemplary timing diagram of FIG. 7, aligned beam detect signal 275A may be low at time t_0 (100 ns) when beam detect signal 240 transitioned from high to low between time t_1 (50 ns) and time t_2 (0 ns). Aligned beam detect signal 275A may return to high after two cycles of phase-shifted clock signal 250A. Persons of skill in the art will appreciate that control logic 230 may be equivalently implemented using logic or mechanisms other than those depicted in and described with respect to FIG. 4.

FIG. 5 shows a logic diagram that may be used to implement selector 220. As shown in FIG. 5, NAND gates 520A, 520B, 520C, and 520D may be coupled to control logic 230. NAND gates 520A, 520B, 520C, and 520D may receive aligned beam detect signals 275A, 275B, 275C, and 275D from control logic 230. The output of each NAND gate 520A, 520B, 520C, and 520D may be coupled to an input connector of each of the other NAND gates 520A, 520B, 520C, and 520D and to inverters 550A, 550B, 550C, and 550D.

As shown in FIG. 5, inverters 550A, 550B, 550C, and 550D may also be coupled to AND gates 530A, 530B, 530C, and 530D, respectively. Inverters 550A, 550B, 550C, and 550D provide AND gates 530A, 530B, 530C, and 530D with corresponding signals 510A, 510B, 510C, and 510D, respectively. In some embodiments, the inputs of AND gates 530A, 530B, 530C, and 530D may be coupled to PWM Pulse Generators 300A, 300B, 300C, and 300D, respectively, and may receive output phase-shifted PWM signals 260A, 260B, 260C, and 260D, respectively. In some embodiments, AND gates 530A, 530B, 530C, and 530D may be coupled to the input of OR gate 540, which may be coupled to driver circuit 108.

When beam detect signal 240 transitions to a low state, there may be a short time when aligned beam detect signals 275A, 275B, 275C, and 275D may all be low at the same time. In the example timing diagram of FIG. 7, aligned beam detect signals 275A, 275B, 275C, and 275D are all low from approximately 125 ns to 175 ns. During this time, each NAND gate 520A, 520B, 520C, and 520D may have as its inputs a high signal from each of the other NAND gates 520A, 520B, 520C, and 520D and a low signal from corresponding aligned beam detect signal 275A, 275B, 275C, and 275D.

One of the aligned beam detect signals 275A, 275B, 275C, and 275D may transition back to a high state before the other beam detect signals. At this point, the NAND gate 520A, 520B, 520C, or 520D corresponding to the first aligned beam detect signal to transition will have all of its inputs at a high state and will cause it to output a low signal. Since output of each NAND gate 520A, 520B, 520C, and 520D is sent as input to each of the other NAND gates 520A, 520B, 520C, or 520D, once the NAND gate 520A, 520B, 520C, or 520D corresponding to the first-transitioning aligned beam detect signal 275A, 275B, 275C, or 275D outputs a low signal, it will cause all of the other NAND gates 520A, 520B, 520C, and 520D to output a high signal regardless of its other inputs. Accordingly, the NAND gate corresponding to the aligned beam detect signal 275A, 275B, 275C, or 275D that is most closely aligned with beam detect signal 240 will be the only NAND gate to output a low signal.

Figure 7:
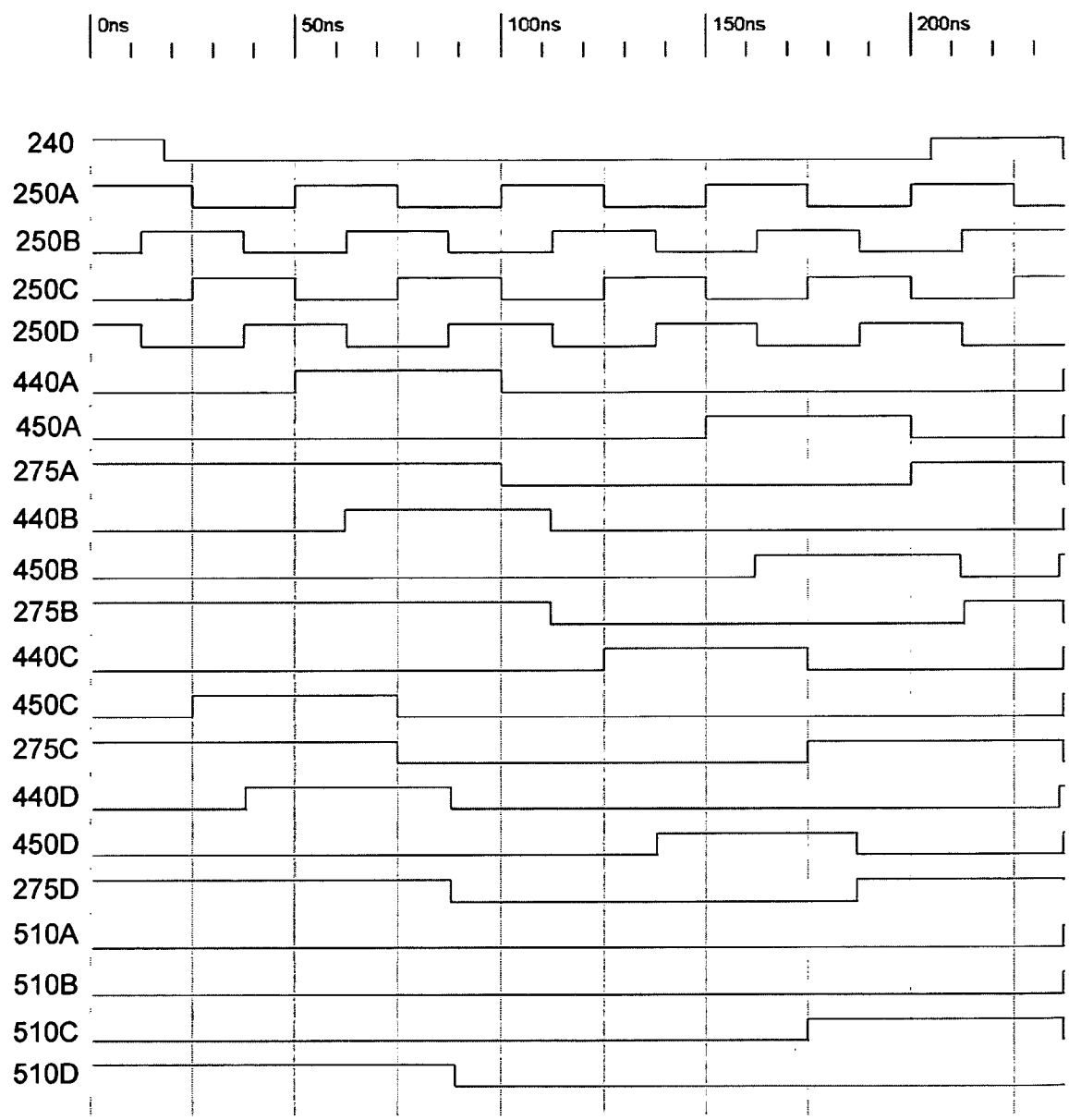
FIG. 7 shows a timing diagram that shows example timing relationships among an example set of signals.

As shown in exemplary timing diagram FIG. 7, aligned beam detect signal 275C may be most closely aligned to beam detect signal 240. Accordingly, NAND gate 520C may have a low output that may be used as input for each of the other NAND gates 520A, 520B, and 520D. NAND gates 520A, 520B, and 520D may thereby be "locked" since each may have at least one low input corresponding to the output from NAND gate 520C, and therefore, may continue to provide a high output signal regardless of the other input signals. In some embodiments, because the output signal from NAND gate 520C is low (in this example), AND gate 530C may receive a high signal 510C from corresponding inverter 550C. Therefore, in some embodiments, AND gate 530C may transmit output phase-shifted PWM signal 260C to OR gate 540.

NAND gates 520A, 520B, and 520D may all be outputting high signals that may be inverted by inverters 550A, 550B, and 550D, respectively, producing low signals 510A, 510B, and 510D. In some embodiments, OR gate 540 may perform a logical OR on the output signals from AND gates 530A, 530B, 530C, and 530D. Since output phase-shifted PWM signal 260C may be transmitted via AND gate 530C while AND gates 530A, 530B and 530D may be transmitting a low signal, PWM output signal 265 may correspond to output phase-shifted PWM signal 260C.

Figure 6:
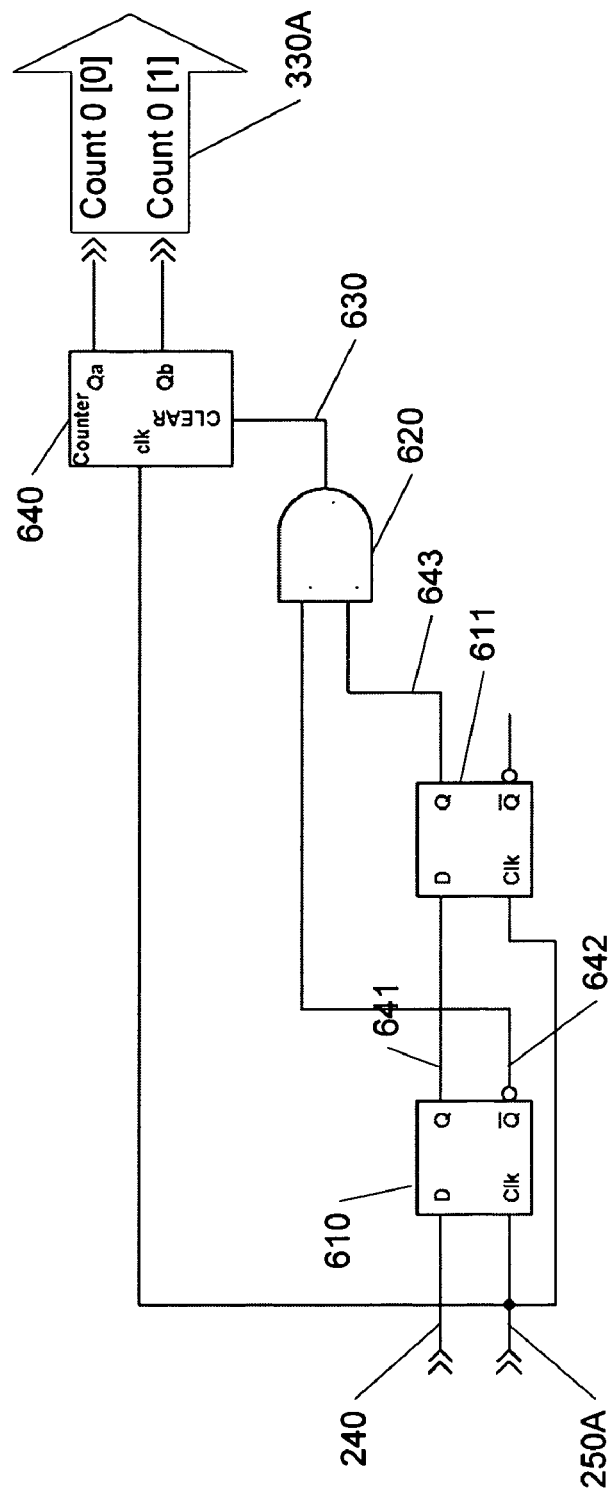
FIG. 6 shows a logic diagram that may be used to implement primary and secondary counters.

FIG. 6 shows a logic diagram that may be used to implement primary and secondary counters 320A, 320B, 320C, and 320D. As shown in FIG. 6, counters 320A, 320B, 320C, and 320D may be implemented using delay modules 610 and 611; AND gate 620; and counter 640. Further, delay module 610 may be coupled to mechanical controller 123; PLL module 235; delay module 611; and/or AND gate 620. Delay module 611 may also be coupled to PLL module 235 and AND gate 620. As shown in FIG. 6, counter 640 may be coupled to AND gate 620, PLL module 235, and PWM generation module 310.

Figure 8:
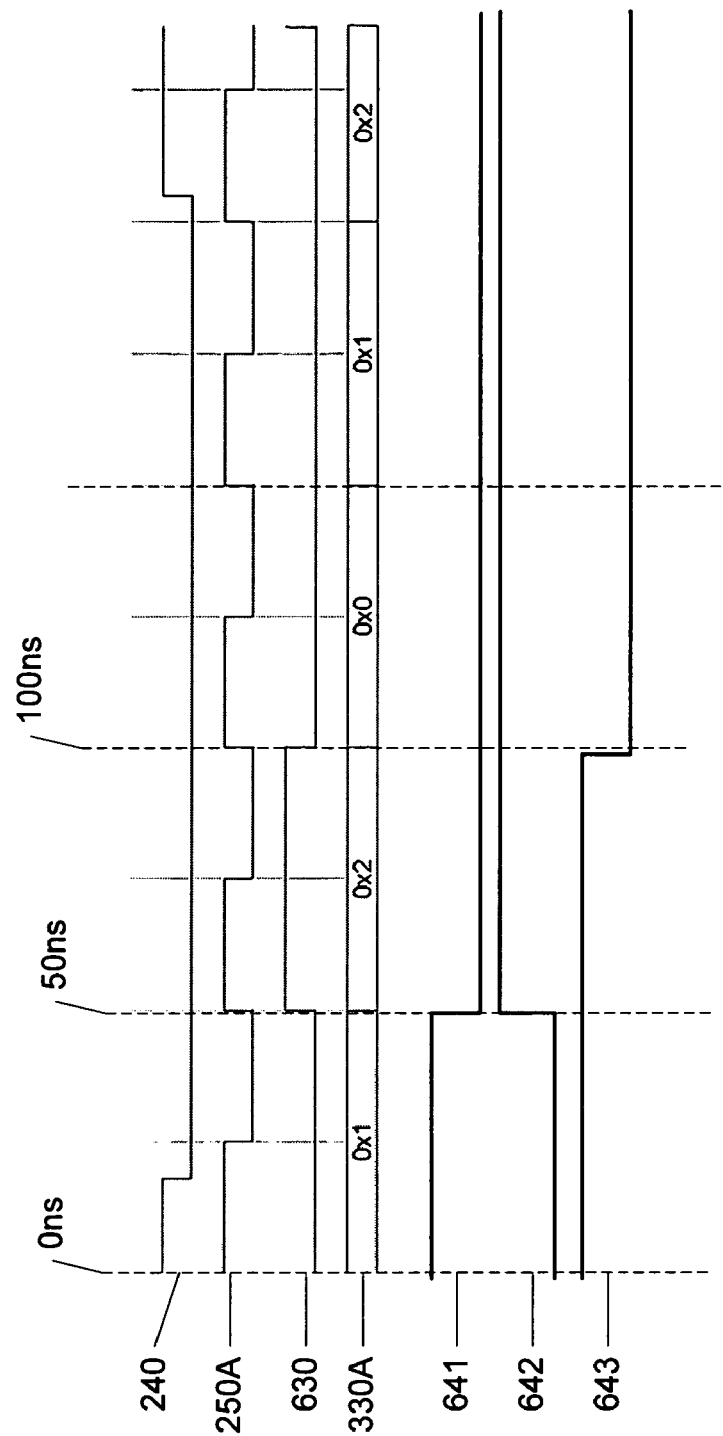
FIG. 8 shows a timing diagram that shows example timing relationships among a set of signals relevant to an exemplary two-bit counter.

In some embodiments, delay modules 610 and 611 and counter 640 may run at the frequency of phase-shifted clock signal 250A. Delay module 610 may transmit delayed beam detect signal 641 to delay module 611 and the delayed inverse of beam detect signal 642 to AND gate 620. Delay module 611 may also transmit delayed beam detect signal 643 to AND gate 620. Therefore, clear signal 630 may be set high when beam detect signal 240 was low at time t_0 and high at time t_1, and clear signal 630 may return to a low state on the next cycle of phase-shifted clock signal 250A. An example of this is depicted in exemplary timing diagram of FIG. 8, where, if t_0 is considered 50 ns, then clear signal 630 is set high at t_0 (50 ns) and beam detect signal 240 was high at t_1 (0 ns) and low at t_0 (50 ns), and clear signal 630 returns to low in the next cycle of phase-shifted clock signal 250A (at 100 ns). Described differently, clear signal 630 is set to high at 50 ns when delayed beam detect signal 643 is high and inverted beam detect signal 642 is high at 50 ns, and clear signal returns to low at 100 ns when delayed beam detect signal 643 returns to low.

In some embodiments, when clear signal 630 is high, counter 640 may be reset to zero. In embodiments where a counter is outputting a two-bit clock 330A, each of the two bits of signal 330A may be zero. On each subsequent cycle of phase-shifted clock signal 250A (when clear signal 630 is low) count data 330A may be incremented by one. For example, in the case of two bit count data 330A, on the four clock cycles after a clear signal 630 is received, the two bits of the count data 330A may be set to [0, 1], [1, 0], [1, 1], and then [0, 0], where the first bit is the most significant bit and the second bit is the least significant bit. An example of this is represented in hexadecimal count data 330A in the timing diagram of FIG. 8. In some embodiments, count data 330A may have more bits and counter 640 may have an equivalently higher number of output bits.

Each delay module 610 and 611, AND gate 620, and counter 640 may be implemented separately or together using an FPGA, an ASIC, a CPLD, a PCB, a combination of programmable logic components and programmable interconnects, or any other combination of devices or modules capable of performing appropriate tasks.

In some embodiments, phase-shifted clock signals 250A, 250B, 250C, and 250D generated by PLL module 235 may be running at a multiple of the frequency of pixel clock signal 245. For illustrative and descriptive purposes only and without otherwise limiting the disclosure herein, presume that phase-shifted clock signals 250A, 250B, 250C, and 250D run at four times the frequency of pixel clock signal 245 and that there are four phase-shifted clock signals 250A, 250B, 250C, and 250D. Furthermore, assume that within each PWM pulse generator 300A, 300B, 300C, and 300D there may be multiple two bit counters 320A, 320B, 320C, and 320D that control the generation of output phase-shifted PWM signal 260A. Since counters 320A, 320B, 320C, and 320D may be reset by beam detect signal 240, counters 320A, 320B, 320C, and 320D may always begin with the same value 330A, 330B, 330C, and 330D after a fixed number of clock edges following a low-transition of beam detect signal 240.

In some embodiments, PWM output signal 265 sent to driver circuit 108 may be synchronized to beam detect signal 240 to within a fraction of a pixel period, thus giving good image quality on a page. Synchronization to within a fraction of a pixel period occurs in part because there may be multiple output phase-shifted PWM signals 260A, 260B, 260C, and 260D each at a different clock phase of which one may be selected and sent to driver circuit 108 (based on which one is most closely aligned with beam detect signal 240) and because there are multiple two bit counters 320A, 320B, 320C, and 320D within each PWM pulse generator 300A, 300B, 300C, and 300D which may be reset at a low-transitioning beam detect signal 240.

In some embodiments, there may be four phase-shifted clock signals 250A, 250B, 250C, and 250D that may run at four times the frequency of pixel clock signal 245 and may be ninety degrees out of phase with each other. In other embodiments, there could be more or fewer phase-shifted clock signals 250A, 250B, 250C, and 250D, running at higher or lower multiples of the pixel clock signal 245, and the phases of phase-shifted clock signals 250A, 250B, 250C, and 250D could be evenly distributed over the cycle of pixel clock signal 245 or unevenly distributed over the cycle of pixel clock signal 245. In some embodiments, having a different number of phase-shifted clock signals 250A, 250B, 250C, and 250D may correspond to having a different number of corresponding logical components as described herein.

For example, when there are four phase-shifted clock signals 250A, 250B, 250C, and 250D running at four times the frequency of pixel clock signal 245, the pixel alignment among printed lines may be within one-sixteenth of a pixel. As a further example, if there were five phase-shifted clock signals 250A, 250B, 250C, and 250D running at three times the frequency of pixel clock signal 245, then the alignment among printed lines may be within one-fifteenth of a pixel. In general, the alignment may be within 1/(N*M) of a pixel when there are N phase-shifted clock signals running at M times the frequency of pixel clock signal 245. In some embodiments, if the phases are not evenly distributed among the N phase-shifted clock signals then the alignment may average 1/(N*M) of a pixel, but exact alignment among printed lines may depend on the spread of the M phase shifts.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pulse width modulation (PWM) device comprising:
a plurality of PWM modules that each receive input data and corresponding input phase-shifted clock signals, wherein each PWM module generates an output phase-shifted shifted PWM signal based on the corresponding input phase-shifted clock signal and the input data; and
a selector that selects one of the output phase-shifted PWM signals based on timing relationships between a first event signal and the input phase-shifted clock signals, wherein the selector comprises a plurality of circuits, each circuit corresponding to one of the PWM modules and receiving the corresponding input phase-shifted clock signals, and wherein each circuit generates a second event signal based on its corresponding input phase-shifted clock signals and the first event signal.

2. The PWM device of claim 1, wherein timing relationships used to select one of the output phase-shifted PWM signals are based further on time duration between the first event signal and one of the second event signals.

3. A pulse width modulation (PWM) device comprising:
a plurality of PWM modules that each receive input data and corresponding input phase-shifted clock signals, wherein each PWM module generates an output phase-shifted PWM signal based on the corresponding input phase-shifted clock signal and the input data; and
a selector that selects one of the output phase-shifted PWM signals based on timing relationships between a first event signal and the input phase-shifted clock signals;
wherein each of the PWM modules comprises:
a first circuit that receives the input phase-shifted clock signal corresponding to the PWM module, and wherein the first circuit generates a second event signal based on its corresponding input phase-shifted clock signal and the first event signal; and
a second circuit that produces a count based on its corresponding input phase-shifted clock signal, wherein the count is reset based on the second event signal.

4. The PWM device of claim 3, wherein each PWM module generates its output phase-shifted PWM signal based on the count and the input data.

5. The PWM device of claim 4, wherein each PWM module receives the input data in synchronization with its corresponding one of the plurality of input phase-shifted clock signal.

6. A method for image alignment comprising:
receiving input data and corresponding input phase-shifted clock signals;
generating an output phase-shifted PWM signal corresponding to each input phase-shifted clock signal and the input data; and
selecting one of the output phase-shifted PWM signals based on timing relationships between a first event signal and the input phase-shifted clock signals;
wherein generating an output phase-shifted PWM signal further comprises generating a second event signal for each input phase-shifted clock signal based on the corresponding input phase-shifted clock signal and the first event signal.

7. The method of claim 6, wherein timing relationships used to select one of the output phase-shifted PWM signals are based further on the time duration between the first event signal and one of the second event signals.

8. The method of claim 6, wherein generating an output phase-shifted PWM signal further comprises:
producing a count based on the corresponding one of the plurality of input phase-shifted clock signal; and
resetting the count based on the second event signal.

9. The method of claim 8, wherein the output phase-shifted PWM signal is based on the count and the input data.

10. The method of claim 9, wherein the input data is received in synchronization with its corresponding one of the plurality of input phase-shifted clock signal.

11. A system comprising:
a plurality of PWM modules that each receive input data and corresponding input phase-shifted clock signals, wherein each PWM module generates an output phase-shifted PWM signal based on its corresponding input phase-shifted clock signal and the input data; and
a selector that selects one of the output phase-shifted PWM signal based on timing relationships between an event signal and the phase-shifted clock signals;
wherein each of the PWM modules comprises:
a first circuit that receives the input phase-shifted clock signal corresponding to the PWM module, and wherein the first circuit generates a second event signal based on its corresponding input phase-shifted clock signal and the event signal; and
a second circuit that produces a count based on the corresponding input phase-shifted clock signal, wherein the count is reset based on the second event signal.

* * * * *